US011182396B2

(12) United States Patent
Rossi et al.

(10) Patent No.: US 11,182,396 B2
(45) Date of Patent: Nov. 23, 2021

(54) SYSTEM AND METHOD FOR A GRAPH SEARCH ENGINE

(71) Applicant: Palo Alto Research Center Incorporated, Palo Alto, CA (US)

(72) Inventors: Ryan A. Rossi, Mountain View, CA (US); Rong Zhou, Saratoga, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 251 days.

(21) Appl. No.: 16/025,554

(22) Filed: Jul. 2, 2018

(65) Prior Publication Data

US 2020/0004888 A1     Jan. 2, 2020

(51) Int. Cl.
    *G06F 16/2457*     (2019.01)
    *G06F 16/9535*     (2019.01)
    *G06F 16/248*      (2019.01)

(52) U.S. Cl.
    CPC ...... *G06F 16/24578* (2019.01); *G06F 16/248* (2019.01); *G06F 16/9535* (2019.01)

(58) Field of Classification Search
    CPC ........... G06F 16/9535; G06F 16/24578; G06F 16/248; G06F 16/9032; G06F 16/90335
    See application file for complete search history.

(56) References Cited

U.S. PATENT DOCUMENTS

| | | | | |
|---|---|---|---|---|
| 7,630,971 | B2 * | 12/2009 | Arrouye | G06F 16/24578 |
| 2009/0240682 | A1 * | 9/2009 | Balmin | G06F 16/248 |
| 2013/0268533 | A1 * | 10/2013 | Komarov | G06F 16/2228 707/740 |
| 2014/0214814 | A1 * | 7/2014 | Sankar | G06Q 30/02 707/723 |
| 2016/0125087 | A1 * | 5/2016 | Mallah | G06F 16/90332 705/14.54 |
| 2019/0340256 | A1 * | 11/2019 | Kulkarni | G06F 16/9535 |

OTHER PUBLICATIONS

Atkinson, et al., "Min-Max Heaps and Generalized Priority Queues", Oct. 1986, Communications of the ACM: vol. 29, pp. 996-1000 (Year: 1986).*
Yang, Shengqi. "Querying Large-scale Knowledge Graphs", Mar. 2015, University of California. (Year: 2015).*

* cited by examiner

*Primary Examiner* — Matthew Ell
*Assistant Examiner* — Lana Alagic
(74) *Attorney, Agent, or Firm* — Shun Yao; Park, Vaughan, Fleming & Dowler LLP.

(57) ABSTRACT

One embodiment provides a system for facilitating a graph search engine. During operation, the system receives, by a server from a client computing device, a search request which includes a user-inputted graph. The system performs a search based on a structure of the user-inputted graph for a plurality of relevant graphs. The system orders the plurality of relevant graphs from a most relevant ranking to a least relevant ranking. The system returns, to the client computing device, the ordered plurality of relevant graphs for display on a user interface of the client computing device, thereby enhancing the search for relevant graphs by allowing the graph search engine to take as an input the user-inputted graph and return as an output the relevant graphs.

20 Claims, 6 Drawing Sheets

Top-K Most Similar Networks/graphs!

| Rank | Graph Name | Type | \|V\| | \|E\| | p | $d_{max}$ | $d_{min}$ | $d_{avg}$ | r | \|T\| | $T_{avg}$ | $T_{max}$ | $K_{avg}$ | K | $\bar{K}$ | $\omega_{max}$ | Size | DL |
|---|---|---|---|---|---|---|---|---|---|---|---|---|---|---|---|---|---|---|
| 1 | socfb-MIT8 | socfb | 22K | 716K | 0.00 | 2K | 1 | 65 | 0.01 | 1M | 500 | 35K | 0.19 | 0.11 | 55 | 13 | 2 MB | ▲ |
| 2 | socfb-Temple83 | socfb | 14K | 365K | 0.00 | 1K | 1 | 52 | 0.03 | 6M | 408 | 17K | 0.21 | 0.19 | 62 | 10 | 1 MB | ▲ |
| 3 | socfb-Penn94 | socfb | 42K | 1M | 0.00 | 4K | 1 | 55 | -0.00 | 22M | 520 | 68K | 0.21 | 0.19 | 63 | 17 | 4 MB | ▲ |
| 4 | socfb-Vermont70 | socfb | 7K | 159K | 0.01 | 884 | 1 | 52 | 0.08 | 3M | 368 | 12K | 0.23 | 0.15 | 47 | 14 | 556 KB | ▲ |
| 5 | socfb-Northeastern19 | socfb | 14K | 382K | 0.00 | 9658 | 1 | 55 | 0.07 | 5M | 362 | 22K | 0.20 | 0.13 | 44 | 11 | 1 MB | ▲ |
| 6 | socfb-Wisconsin87 | socfb | 24K | 836K | 0.00 | 3K | 1 | 70 | -0.00 | 15M | 602 | 47K | 0.21 | 0.12 | 61 | 12 | 3 MB | ▲ |
| 7 | socfb-UF58 | socfb | 13K | 323K | 0.00 | 6997 | 1 | 48 | 0.15 | 5M | 440 | 16K | 0.23 | 0.15 | 60 | 10 | 983 KB | ▲ |
| 8 | socfb-BU10 | socfb | 20K | 638K | 0.00 | 2K | 1 | 64 | 0.05 | 9M | 468 | 22K | 0.19 | 0.12 | 57 | 13 | 2 MB | ▲ |
| 9 | socfb-UCSD34 | socfb | 15K | 443K | 0.00 | 2K | 1 | 59 | 0.03 | 8M | 534 | 26K | 0.23 | 0.15 | 57 | 12 | 1 MB | ▲ |
| 10 | socfb-Maine59 | socfb | 9K | 243K | 0.01 | 1K | 1 | 53 | 0.07 | 3M | 260 | 8K | 0.24 | 0.15 | 45 | 11 | 719 KB | ▲ |

FIG. 3

SYSTEM AND METHOD FOR A GRAPH SEARCH ENGINE

BACKGROUND

Field

This disclosure is generally related to a search engines. More specifically, this disclosure is related to a system and method for a graph search engine.

Related Art

The proliferation of the Internet and e-commerce continues to create a vast amount of digital content. Search engines exist to aid a user in finding relevant data among the vast amount of digital content. Conventional search engines, such as Google, rely on user queries in the form of textual information (either typed or spoken), and thus cannot utilize the relations within or among different data. One traditional representation of these relations is a graph, where nodes are data objects and edges are the relations among them.

In conventional search engines, when searching specifically for graphs, a user may input a text string describing the graph of interest (e.g., "social network data" or "technological networks"), and the returned output may be a list of potential matches which are based on textual content, usually of websites, documents, and similar sources.

While these conventional search engines may be sufficient in the case of web sites and documents with large amounts of textual information, they work poorly for graph data with limited textual information. One crucial area in which these conventional search engines are lacking is that they cannot use the most important and fundamental information about the graph data: the structural properties and characteristics of the graph of interest. Thus, conventional search engines are not able to answer even simple graph queries based on the structural properties of the graph of interest. This can result in an inefficient system for data mining and searching the vast amount of digital content.

SUMMARY

One embodiment provides a system for facilitating a graph search engine. During operation, the system receives, by a server from a client computing device, a search request which includes a user-inputted graph. The system performs a search based on a structure of the user-inputted graph for a plurality of relevant graphs. The system orders the plurality of relevant graphs from a most relevant ranking to a least relevant ranking. The system returns, to the client computing device, the ordered plurality of relevant graphs for display on a user interface of the client computing device, thereby enhancing the search for relevant graphs by allowing the graph search engine to take as an input the user-inputted graph and return as an output the relevant graphs.

In some embodiments, performing the search is further based on one or more of: structural properties of the user-inputted graph; metadata associated with the user-inputted graph; and user-defined constraints. The metadata can include one or more of: unstructured metadata, which includes one or more of a description of data associated with the user-inputted graph, a type of the user-inputted graph, a type of a node or an edge in the user-inputted graph, and any text-based metadata; and semi-structured metadata.

In some embodiments, performing the search is further based on one or more of: multiple levels of granularity; and previously cached graphs which are obtained based on pre-computed properties for finding and returning a ranking of relevant graphs in real time. The multiple levels of granularity can include one or more of: a macro or a global property of the user-inputted graph; and a micro or a local property of the user-inputted graph.

In some embodiments, ordering the plurality of relevant graphs is based on a ranking function.

In some embodiments, the system defines a simple language based on mathematical notations and symbols for properties and values of a graph, wherein the search request indicates specific filters using the simple language. Prior to ordering the plurality of relevant graphs, the system filters the plurality of relevant graphs based on the specific filters indicated in the search request.

In some embodiments, the system enhances the performing of the search or the ordering of the plurality of relevant graphs based on one or more of: a representation learning technique; a normalization technique; a non-linear scaling technique; a weighting scheme; and a low-rank approximation technique.

In some embodiments, the system applies an online learning technique by including implicit or explicit relevancy feedback for the user-inputted graph as training examples. The system updates a model associated with the user-inputted graph based on the relevancy feedback to improve the ordering of the plurality of relevant graphs over time.

In some embodiments, the system stores a predetermined number of the ordered plurality of relevant graphs based on a min-max heap which requires a fixed amount of memory. The system determines whether a specific graph is in the stored predetermined number of the ordered plurality of relevant graphs in an $O(1)$ or a constant time. The system inserts or deletes a graph from the stored predetermined number of the ordered plurality of relevant graphs in a time which is based on a logarithm of the predetermined number.

In some embodiments, in response to accessing, in an in-memory cache, a feature of a relevant graph or a result which includes an ordered plurality of relevant graphs, the system updates a weight associated with the feature or result to prevent the feature or result from being deleted from the in-memory cache.

In some embodiments, performing the search is further based on properties associated with the user-inputted graph, including one or more of: a type or a size of the user-inputted graph; a number of nodes; a number of edges; a density; a degree or a number of incident edges; an assortativity; a number of triangles; an average or a maximum clique; an average or a global clustering coefficient; a clique number; a maximum k-core; a temporal property; a spatial property; an attributed property; a labeled property; multiple types of properties; a heterogeneous property; and any property associated with a graph.

BRIEF DESCRIPTION OF THE FIGURES

FIG. 3 presents a table illustrating exemplary results from a graph search engine, in accordance with an embodiment of the present invention.

In the figures, like reference numerals refer to the same figure elements.

DETAILED DESCRIPTION

Figure 1:
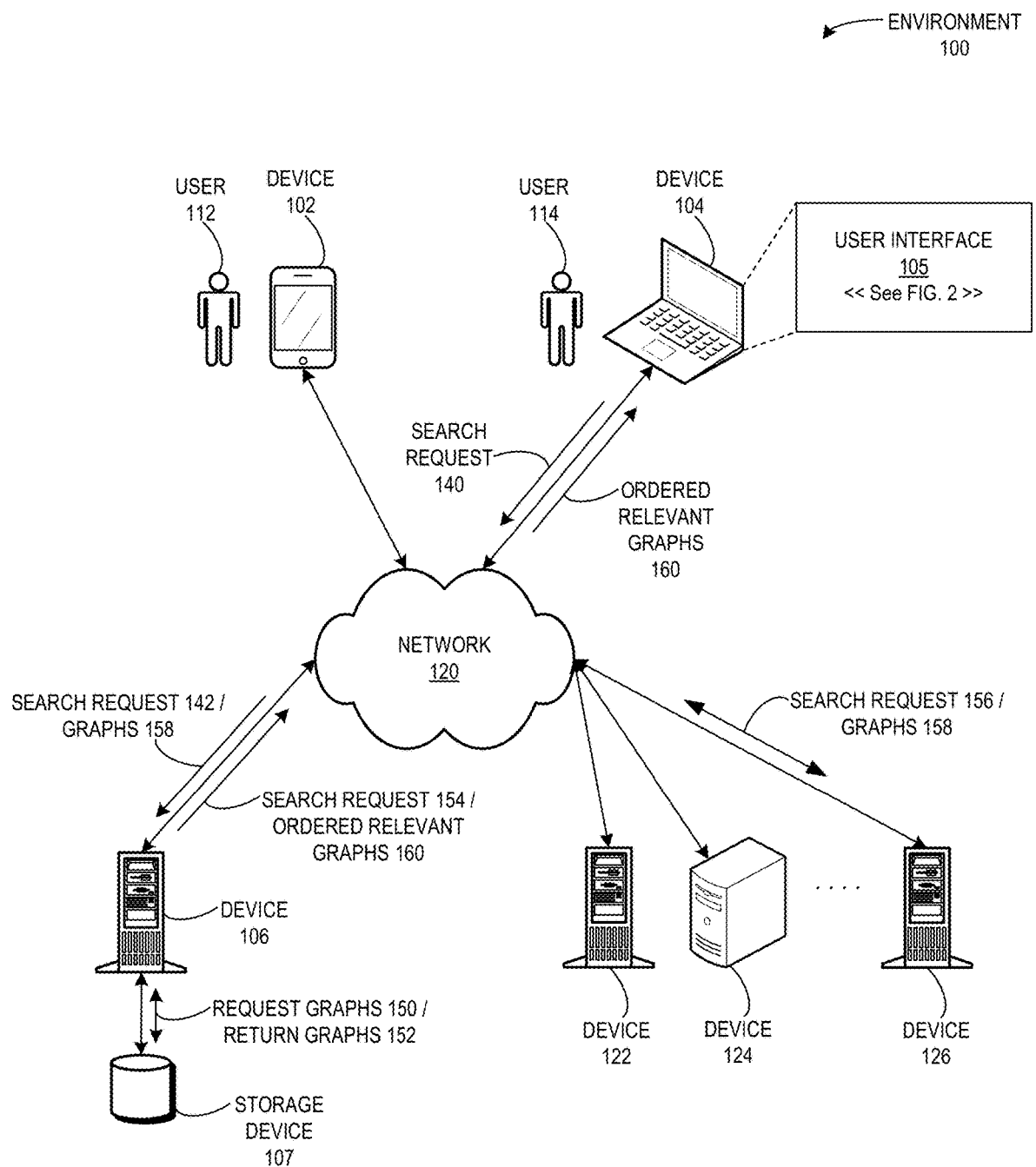
FIG. 1 illustrates an exemplary environment for facilitating a graph search engine, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which solves the problem of efficiently searching a vast amount of digital content based on structural properties of a graph. The system provides a graph search engine which takes as input a user-inputted query graph and returns as output an ordered or a ranked list of relevant graphs, which are sorted based on how well they match or are similar to the user-inputted query graph.

In conventional search engines, when searching specifically for graphs, a user may input a text string describing the graph of interest (e.g., "social network data" or "technological networks"), and the returned output may be a list of potential matches which are based on textual content, usually of websites, documents, and similar sources.

While these conventional search engines may be sufficient in the case of web sites and documents with large amounts of textual information, they work poorly for graph data with limited textual information. One crucial area in which these conventional search engines are lacking is that they cannot use the most important and fundamental information about the graph data: the structural properties and characteristics of the graph of interest. Thus, conventional search engines are not able to answer even simple graph queries based on the structural properties of the graph of interest. This can result in an inefficient system for data mining and searching the vast amount of digital content.

The embodiments of the system described herein provide a graph search engine, which allows a user to define and input a query graph H. The system can return relevant graphs based on structural properties of the graph, and, if available, any metadata, constraints, etc. For example, the user can define preferences for specific structural properties, and the system can execute an algorithm which places more weight on graphs which match the specific user-defined structural properties.

The system can search for graphs at multiple levels of granularity, including: macro or global properties of a graph; and micro or local properties of nodes and edges in a graph. A graph can be indicated as a column vector containing both macro properties and micro properties of interest, and the column vector can contain all structural properties of a particular graph. The system can pre-compute relevant data and store the pre-computed relevant data on disk. The system can also insert and delete a graph into an in-memory cache for retrieving frequently accessed data, which can result in an improved and more efficient retrieval (e.g., the system can check the cache for the vector prior to retrieving the vector from disk).

The system can use any ranking function to return the ordered most relevant graphs. In general, the ranking function takes into account various factors, including a combination of macro and micro graph properties, metadata, and any user-defined constraints. The system can assign a final weight to each graph based on a weighted linear combination of these various factors. Furthermore, the ranking function may be learned using standard techniques. The terms "ranking" and "ordering" are used interchangeably in this disclosure, and refer to applying a ranking function to a plurality of relevant graphs to sort and arrange the relevant graphs based on the ranking function.

Thus, the embodiments described herein provide a computer system which improves a user's ability to search a vast amount of digital content for useful or relevant information (e.g., data mining). By providing a graph search engine, the system allows a user to input a query graph, and returns to the user a ranked list of relevant graphs sorted based on how well they match the user-inputted query graph. The system thus enhances and improves the technological area of data mining by allowing the user to utilize the relations within or among different data, where the relations are represented in graphs as nodes and edges.

The claimed system is a technological solution (a graph search engine which takes a user-inputted query graph and returns a ranked list of relevant graphs) to a technological problem (utilizing relations within and among different data to improve a search for relevant data in a vast amount of digital content). Furthermore, the improvements are fundamentally technological, can result in a more efficient search engine, and can be applied to a variety of practical, concrete, and tangible applications, as described herein.

Overview of a Graph Search Engine: Properties/Features

Let H denote a user-inputted query graph. Given the user-inputted graph H (i.e., the user-inputted and user-specified query), the embodiments of the system described herein can return a ranked list R of relevant graphs. While the system can define relevancy in many different ways, for simplicity, relevancy can be indicated by an ordered set of graphs $R=\{G_1, G_2, G_3, \ldots, G_n\}$ which are similar to the user-inputted graph H. The system (or the user) can also limit R to be the q most similar graphs based on a graph ranking function $f: f(H, G_i)$.

Note that this is similar to conventional search engines, which usually present only the documents that are most relevant to the input query. The ordered set of graphs R can be sorted from the most relevant graphs to the least relevant graphs, such that the graphs in R satisfy the following:

$$f(H,G_1) \leq f(H,G_2) \leq \ldots \leq f(H,G_n)$$

The system can perform the search for relevant graphs at multiple levels of granularity, including based on: macro or global properties of a graph; and micro or local properties of a graph. Macro properties can include but are not limited to: point/scalar statistics computed via aggregate functions over the nodes and edges; other univariate statistics (e.g., variance and skew); and graph parameters. Micro properties can include but are not limited to: distributions of graph measures; general graph features (e.g., features computed over nodes and edges in general); and node and edge statistics, measures, properties, etc.

Some macro properties may be derived based on micro properties (e.g., the average degree can be computed from the vector of degrees). The terms "properties" and "features" are used interchangeably in this disclosure. The term "feature" can refer to a macro/micro property or, more generally, a feature learned from a representation learning method, which may be based on the graph G or a macro/micro property of the graph.

The properties can be ranked by cost in terms of the space and time required to return a result to a query inputted into a graph search engine, e.g., macro global properties<graph distributions<node properties<edge properties. This exemplary ranking assumes that there are more edges than nodes, which in practice is usually true. This exemplary ranking also assumes that the properties are already computed and stored.

For example, let $x_i$ denote a column vector for graph $G_i$ containing both macro and micro properties of interest (and more generally any features):

$$x_i = \begin{bmatrix} x_i^G \\ vec(X_i) \end{bmatrix}, \quad \text{Equation (1)}$$

where $x_i^G$ is a vector of macro global properties (or features) for graph i, and $vec(X_i)$ is the vectorization of the matrix/tensor $X_i$ containing the micro properties (or micro features) of graph i. Thus, $x_i$ is the resulting vector which contains all structural properties of the graph i. All such data may be pre-computed and stored on disk, and inserted into an in-memory cache which allows retrieval of frequently accessed data. Upon receiving a request, the system can check the cache for the vector prior to retrieving it from disk. By managing the memory in this way (i.e., storing the vector in the in-memory cache based on access frequency of the data), the system can improve the overall efficiency and performance of the graph search engine.

Exemplary Computation Times

Let m denote the number of macro properties; let s denote the number of micro properties (e.g., distributions computed from local node and edge statistics); and let b denote the number of unique values or bins on average. Given the computed properties (or more generally features), the cost of comparing two graphs is as follows: O(m) for comparing graphs at the macro level; and O(s*b) for comparing graph distributions. Furthermore, if n is the number of graphs in the database, obtaining a ranking using only macro-level properties takes O(nm) and obtaining a ranking using only graph distribution takes O(nsb). Thus, when using both macro-level properties and graph distributions, obtaining the ranking takes O(n(m+sb)). This assumes a reasonable ranking function $f$. The system can also leverage sketching and other techniques to reduce the computational cost of comparing (and ranking) graphs.

Exemplary Environment and Communication

FIG. 1 illustrates an exemplary environment 100 for facilitating a graph search engine, in accordance with an embodiment of the present invention. Environment 100 can include: a device 102 and an associated user 112; a device 104 and an associated user 114; a device 106 coupled to a storage device 107; and devices 122, 124, and 126. Devices 102, 104, 106, 122, 124, and 126 can communicate with each other via a network 120. Devices 102 and 104 can be client computing devices, including but not limited to a laptop, a mobile device, and a computer. Device 104 can display a user interface 105, as depicted below in relation to FIG. 2. Devices 122-126 can comprise a repository or a database of graphs. Device 122-126 may be individual machines which are not related to each other, or devices 122-126 may be part of an overall distributed storage system or related database.

During operation, user 114 (via device 104) can input a query graph H (not shown) on user interface 105, and send to device 106 via network 120 a search request 140 which includes the user-inputted query graph H. Device 106 can access coupled storage device 107 to request specific graphs via a request graphs 150 communication, where the requested graphs are subsequently received by device 106 via a return graphs 152 communication.

Device 106 can also send a search request 154 to any or all of devices 122-126 via network 120. For example, device 126 can receive a search request 156, which includes the user-inputted query graph H. Device 126 can send back to device 106 graphs 158 which are relevant based on structural properties, metadata, or user-defined constraints of the user-inputted query graph H or as defined by the user based on a simple language.

Upon receiving graphs 158, device 106 can order or rank a plurality of relevant graphs (which can include both graphs 152 and graphs 158, along with any other graphs returned from other servers, databases, or storage device). Device 106 can order the plurality of relevant graphs based on a ranking function, and can return ordered relevant graphs 160 to device 104. Note that device 106 can also return a predetermined number of most relevant graphs. The predetermined number can be configured by the user as part of search request 140, or pre-configured by the user as a setting related to the graph search engine, or pre-configured to a default set by device 106. Device 104 can display the ordered relevant graphs 160 in the user interface 105 of device 104. User 114 can subsequently refine or filter the results of his initial search request (i.e., the resulting list of ordered relevant graphs 160) based on the simple language, and further based on a user-defined constraint related to any structural property of a graph.

How to Search for Relevant Graphs: Ranking Function, Structural Properties, Metadata, and a Simple Natural Language In the embodiments described herein, the graph search engine may use any ranking function $f$ to rank the returned relevant graphs based on the user-inputted query graph H. In general, the ranking function $f$ takes into account various factors, including a combination of macro and micro graph properties, metadata, and user-defined constraints. The system can assign a final weight to each graph based on a weighted linear combination of these various factors. Furthermore, the ranking function $f$ may be learned using standard techniques.

A user can search for relevant graphs using only the graph structure, e.g., the user can drag-and-drop a graph file which defines the structure of interest. A user can also search for relevant graphs using metadata, or via a simple language. The system can exploit the metadata to improve the search results. Metadata can generally be categorized into two main types: unstructured metadata and semi-structured metadata. Unstructured metadata can include a description of the graph data (used to query the graph search engine), the type of the graph (e.g., a social or a biological graph), the type of the node or edge, and other text-based metadata. Semi-structured metadata can include constraints, such as whether the user is only interested in finding similar directed/undirected graphs, bipartite graphs, weighted graphs, typed or heterogeneous graphs, graphs with attributes, and/or time-based graphs.

The system can also define a simple language using standard mathematical notations and symbols for graph properties and measures (e.g.: E=edge set; V=node set; d=degree; dist=graph distance, etc.). The user can use the defined simple language to easily and quickly filter results to find relevant graphs. For example, the user may be interested only in graphs which contain more than a billion edges, and could easily represent this constraint as |E|>1B. As another example, the user may be interested in small-world graphs, or graphs that have an average degree d of at least a predetermined threshold or number. The system can also apply text analysis, text-based information retrieval, or natural language processing (NLP) techniques to process and derive a score from any text data given as input by the user. Furthermore, the system can use standard techniques in information retrieval and machine learning to, e.g., normalize the scores, or down weight certain aspects or classes of graphs.

As discussed above, the system can also store previous results, and use the stored previous results to improve the results returned in future graph queries by leveraging online machine learning algorithms. The system can also define a rank-based ensemble method where multiple ranking are used to obtain better or improved search results (e.g., via precision, recall, fall-out, etc.). Potentially different rankings may arise by varying one or more factors used in the ranking function $f$ (e.g., the evaluation criterion).

When a new graph is to be inserted into the database, the system can update all relevant information in an online fashion. The system can also leverage other standard methods, such as folding a data point into the low-rank space and subsequently updating the models from scratch in a batch. The system can add the new graph to the database in a variety of ways. For example, a user (or the system) can discover and download graph data on the web via crawling (similar to conventional text-based search engines such as Google). A user (or the system) can also add a previous graph used as a query, along with any metadata. This assumes that a pertinent privacy policy discloses any relevant metadata.

Exemplary User Interface and Results from a Graph Search Engine

Figure 2:
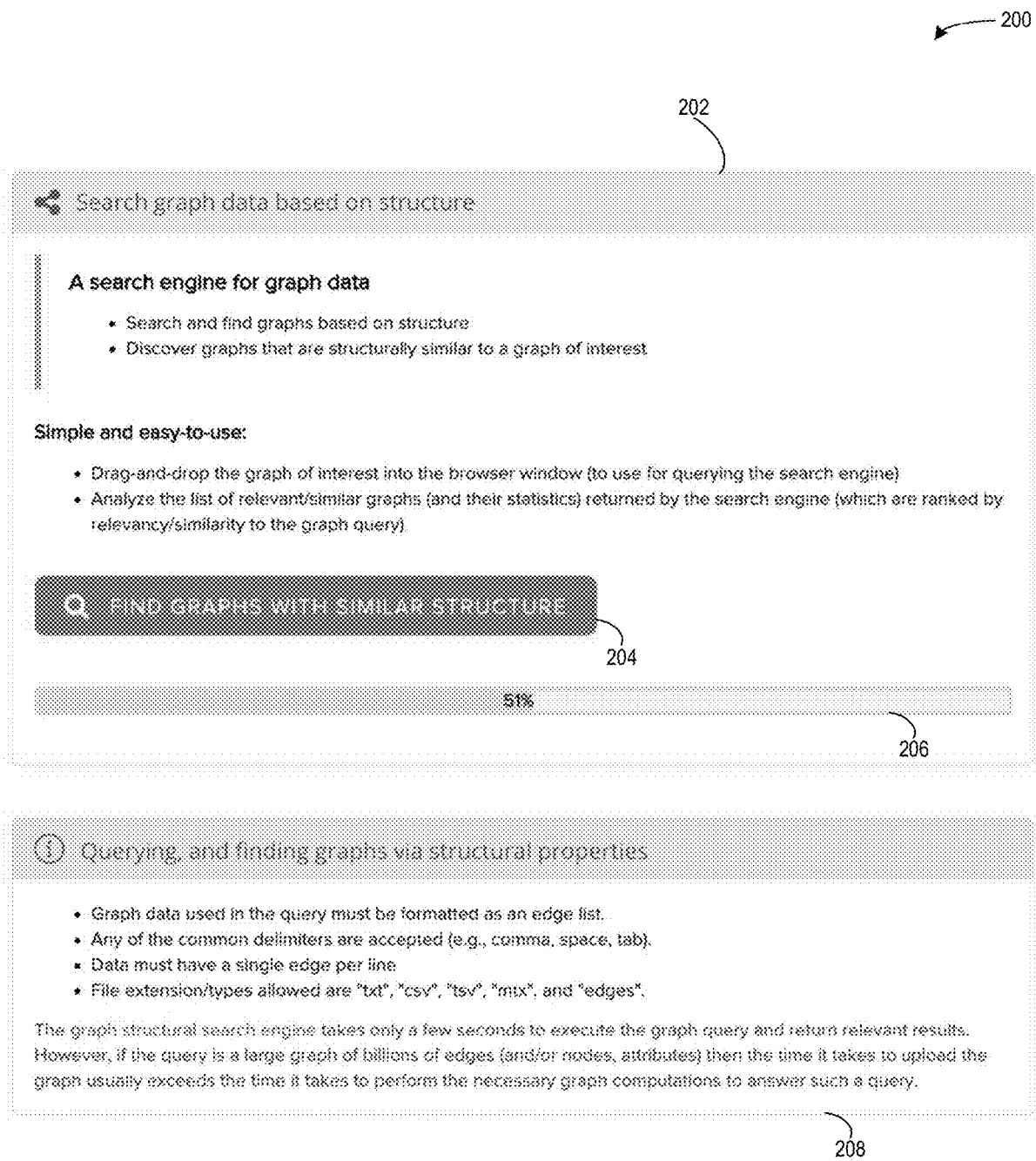
FIG. 2 illustrates an exemplary user interface for a graph search engine, in accordance with an embodiment of the present invention.

FIG. 2 illustrates an exemplary user interface 200 for a graph search engine, in accordance with an embodiment of the present invention. User interface 200 can include a search window 202 and an information window 208. Search window 202 can include general instructions on how to use the graph search engine. For example, search window 202 can contain text which instructs the user how to input a query graph: "Drag-and-drop the graph of interest into the browser window (to user for querying the search engine)." Search window 202 can also contain text which instructs the user what to do with results of the search: "Analyze the list of relevant/similar graphs (and their statistics) returned by the search engine (which are ranked by relevancy/similarity to the graph query)." Information window 208 can include specific information on the types of files which can be used as the user-inputted query graph, including the allowable file extensions/types.

When the user drags and drops a graph of interest into search window 202, the graph of interest may appear as an icon, or be indicated with a graphic or text (not shown). The user can then click on a "Find Graphs With Similar Structure" widget 204, and the system can display a current status of performing the search via a status bar 206.

Search window 202 may also include a "Browse" widget (not shown), which can allow the user to browse files accessible from the user's computing device (including other devices which are coupled to the user's computing device, or with which the user's computing device can communicate via a network or the Internet). While browsing potential graph files, the user can select a query graph, which can cause the selected query graph (i.e., the user-inputted graph) to appear as an icon (or be indicated with a graphic or text) in search window 202. The user can subsequently click on "Find Graphs with Similar Structure" widget 204 to initiate the search.

In some embodiments, search window 202 may include an "Advanced Search Options" widget (not shown), which allows the user to include user-defined constraints. For example, the user may only be interested in graphs which contain more than 190,000 edges, and could express this using a simple language, e.g., |E|>190,000. The user can also specify or configure a number of relevant ordered graphs to be returned. Alternatively, the system can returned a predetermined number of the top most similar graphs to the user-inputted graph.

FIG. 3 presents a table 300 illustrating exemplary results from a graph search engine, in accordance with an embodiment of the present invention. Table 300 can include an ordered list of the most relevant graphs which are most similar to a user-inputted query graph. The ordered list of relevant graphs can include a row entry for each relevant graph, and each row can include values for specific graph features/properties in the following columns: a type 302, which denotes the type of the graph; a number of vertices or nodes ("|V|") 304, which denotes an absolute value for the number of vertices or nodes in the graph; a number of edges or links ("|E|") 306, which denotes an absolute value for the number of edges or links in the graph; a density $\rho$ 306; a $d_{max}$ 310, which denotes a maximum degree or a maximum number of incident edges of the vertices of the graph; a $d_{min}$ 312, which denotes a minimum degree or a minimum number of incident edges of the vertices of the graph; a $d_{avg}$ 314, which denotes an average degree or an average number of incident edges of the vertices of the graph; an assortativity r 316, which denotes a preference for the node to attach to others that are similar in some way; a number of triangles ("|T|") 318, which denotes an absolute value for the total number of triangles of the graph; a $T_{avg}$ 320, which denotes an average number of triangles per vertex of the graph; a $T_{max}$ 322, which denotes a maximum number of triangles per vertex of the graph; a $K_{avg}$ 324, which denotes an average clustering coefficient or the size of the average clique in the graph; a K 326, which denotes the global clustering coefficient, a fraction of closed triangles, or the size of the maximum clique in the graph; a K 328, which denotes the maximum k-core of the graph or the maximal subgraph with minimum degree at least k; a $\omega_{heu}$ 330, which denotes a clique number of the graph or the number of vertices in a maximum clique in the graph); a size 332, which denotes the size of the graph; and a download icon 334, which, when clicked by the user, allows the user to download the respective graph. Note the graph features/properties depicted in table 300 do not include an exhaustive list of graph features/properties which may be generated and displayed on the user interface of a client computing device as a resulting list of ordered relevant graphs. Other graph features/properties may also be included on the displayed list.

For example, the user can use the graph "socfb-CMU" (indicating a social network graph related to Facebook from Carnegie Mellon University (CMU) in Pennsylvania) as the user-inputted graph query. The user (or the system) can specify or determine to view (or return/display) the top q=10 results from a search using the graph. The system can perform the search based on, e.g., the graph structure, metadata, and any user-defined constraints. In this case, the system can perform a search in a graph database which contains over 4,000 graphs from more than 20 domains. The system can obtain a plurality of relevant graphs returned from the search. The system can subsequently return, to a client computing device of the user, the ordered plurality of relevant graphs. In this instance, the system returns the top 10 relevant graphs to the user, which graphs are displayed on a user interface of the client computing device of the user.

Note that the top 10 relevant graphs returned by the graph search engine and depicted in table 300 are clearly similar, as they are all Facebook networks from various universities. Furthermore, note that the graphs ranked $2^{nd}$ and $3^{rd}$ (Temple University and Pennsylvania State University) are from the same state (Pennsylvania) as the query graph (CMU).

In some embodiments, the system can output the results in a similar fashion as Google or other conventional search engines, i.e., where a brief description of each graph can be displayed, along with important statistics, etc.

Exemplary Practical Applications of a Graph Search Engine

The embodiments of the system described herein may be used in the area of sub-graph detection. Given a (synthetic) graph H, the system can predict with near perfect accuracy the model (graph generator) used to generate H (i.e., the governing model). This problem is similar to an important research challenge posed in the Defense Advanced Research Projects Agency (DARPA) Modeling Adversarial Activity (MAA) program. The system can also predict the general type/domain of a given real-world graph with accuracy. However, one problem is the subjective categorization of real-world graphs to particular domains, which often overlap. Furthermore, given a template sub-graph query H, a user may be interested in finding graphs in the database that are likely to contain H. This issue can be associated with the covert network detection problem. The system also has applications in graph matching and entity resolution, along with graph similarity queries. A user can also exploit the system to find nodes which are identical with a high probability.

The embodiments of the system described herein may also be used in the area of graph classification and categorization. A user can assign each graph in the database to a number or hierarchy of graph classes (e.g., via hierarchical clustering or low-rank approximation techniques). Subsequently, given a new graph H, the user can assign H to the graph class that is most similar with respect to the centroid of each graph class. The system can learn the number of graph classes k by using a model selection criterion, e.g., Minimum Description Length (MDL), Akaike Information Criterion (AIC), and Bayesian Information Criterion (BIC). The system can exploit these centroids to speed up the graph search engine (which results in returning results faster in real time) by pruning the search space (i.e., the number of graphs needed to compare). The system can first compare the properties of H to each of the class centroids, and then select the k most similar centroids. The system can then use only the graphs assigned to each of those classes to compute the ranked list. In many applications, it may be essential to correctly rank the most relevant graphs (e.g., the top 10 or 20 graphs), while it is significantly less essential to correctly order the less relevant graphs. Thus, the user should treat the two cases differently, by placing more importance on correctly ranking the most relevant graphs.

Another area of practical application for the described embodiments is in the detection of anomalies. A user can leverage the graph search engine to detect potential problems and/or differences between the user-inputted query graph and other similar graphs (whether or not returned as the ranked list R). For example, assume that the query graph H is a large graph (e.g., a friendship/interaction network, or a re-tweet network), for which data is collected using a process P. The user can therefore expect H to be similar to social networks in general, and more specifically, to twitter graphs (e.g., other re-tweet graphs). If the user discovers in the results that this is not the case, the results may indicate an anomaly, and the user may use a different collection process other than P, such as a different method of crawling. The user can also determine that the collected graph H (using process P) is too small or too noisy to capture the important structural characteristics that govern these types of graphs. The described embodiments can also be used in other ways for detecting anomalies.

The system can further be used for intelligent workflow automation by representing each workflow as a simple graph. The graph search engine can find similar graphs to a given workflow, which can result in improving the prediction of a successful or efficient workflow.

Another area of practical application for the described embodiments is the recommendation of similar scientific graph data. A particular task can be defined formally as an objective function containing constraints, etc. The system can take as input a particular task, an algorithm for the task, and a graph Gq used for evaluation, and find as output a set of graphs G={$G_1$, $G_2$, . . . } that are significantly similar to Gq based on structural properties. A user can use the output for identifying data for evaluation/benchmarking purposes. For example, if a graph with some structural properties works well for solving a particular problem via a particular method (i.e., using a particular algorithm), then it may be inferred that most graph methods are likely to perform quite differently on graphs with different structural properties. Thus, a user can use the methods, e.g., to find similar graphs for benchmarking/evaluation purposes, or simply to validate existing methods.

Thus, by applying the embodiments described herein to these practical areas, the disclosed system can effect improvements and enhancements in many areas of technology, including: sub-graph detection; graph classification and categorization; anomaly detection; intelligent workflow automation; and recommendation of similar scientific graph data. These technological areas are related to the general idea of data mining, i.e.: to examine large databases in order to generate new information; to find anomalies, patterns, and correlations within large data set to predict outcomes; and to use the new information and predicted outcomes to improve the performance of a technological, business, or other system.

Method for Facilitating a Graph Search Engine

Figure 4:
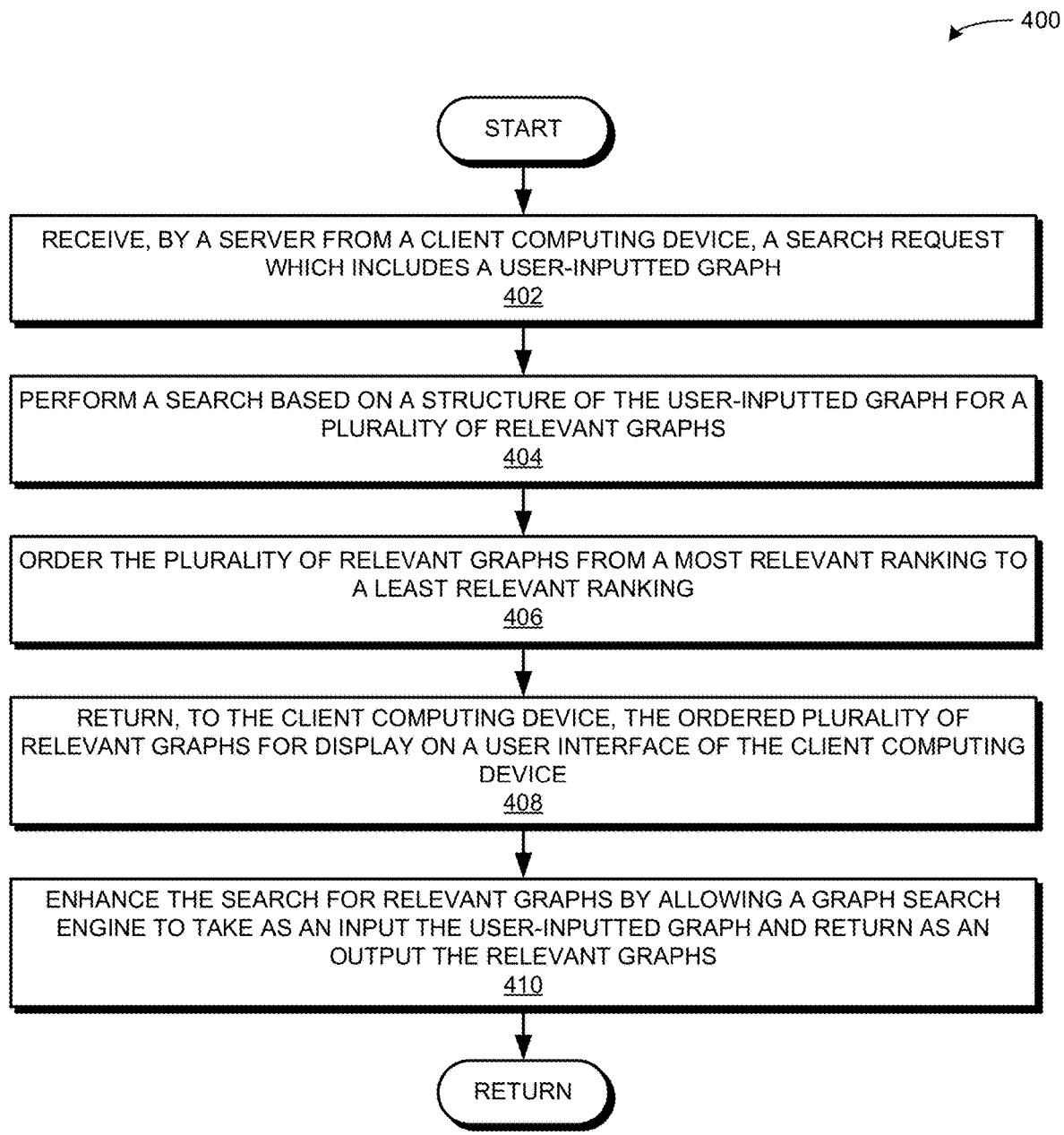
FIG. 4 presents a flow chart illustrating a method for facilitating a graph search engine, in accordance with an embodiment of the present invention.

FIG. 4 presents a flow chart 400 illustrating a method for facilitating a graph search engine, in accordance with an embodiment of the present invention. During operation, the system receives, by a server from a client computing device, a search request which includes a user-inputted graph (operation 402). The system performs a search based on a structure of the user-inputted graph for a plurality of relevant graphs (operation 404). Performing the search can be based on, e.g., structural properties of the user-inputted graph, metadata associated with the user-inputted graph (structured or semi-structured metadata), and user-defined constraints. Performing the search can further be based on multiple levels of granularity, e.g., a macro/global property/feature or a micro/local property/feature.

The system orders the plurality of relevant graphs from a most relevant ranking to a least relevant ranking (operation 406). The system returns, to the client computing device, the ordered plurality of relevant graphs for display on a user interface of the client computing device (operation 408). The system enhances the search for relevant graphs by allowing the graph search engine to take as an input the user-inputted graph and return as an output the relevant graphs (operation 410).

The system can also define a simple language based on mathematical notations and symbols for the properties and values of a graph. In the search query (e.g., as part of or along with the user-inputted graph), the user can indicate specific filters using the simple language. In turn, prior to ordering the plurality of relevant graphs, the system can filter the plurality of relevant graphs based on the specific filters.

Additional Characteristics of a Graph Search Engine

The embodiments of the system described herein can learn ranking functions, using standard algorithms and techniques such as Support Vector Machines (SVMs), neural networks (e.g., RankNet), ordinal regression models, boosting (e.g., RankBoost), and gradient boosted decision trees. The system can use representation learning techniques to automatically learn better features to improve the ranking provided by the graph search engine.

The system can also exploit any low-rank approximation technique, normalization scheme, non-linear scaling, and/or weighting scheme. As an example, the system can assign a certain weight to each stored feature or property of a relevant graph. When the system accesses a particular feature or property of the relevant graph (e.g., in an in-memory cache), the system can update the weight associated with the feature or property. This can result in preventing the feature or property (or previously stored relevant graph) from being deleted from the in-memory cache.

The system can further use any online learning technique to determine results of user interactions with given graphs, include the results as additional training examples for a model, and update the model accordingly to improve future rankings. For example, upon returning the search engine results to the user (e.g., the list of ordered relevant graphs), the system can collect "relevancy feedback," which I user data relating to how the user interacts with the results. The relevancy feedback can include, e.g., whether the user analyzes a particular relevant graph, how the user analyzes the particular graph, and how much time the user spends analyzing the particular graph. By applying an online learning technique, the system can improve the rankings that it returns (i.e., the search engine results) over time, and can continue to obtain more training examples, and create or generate more accurate models for ranking.

Exemplary Computer and Communication System; Exemplary Apparatus

Figure 5:
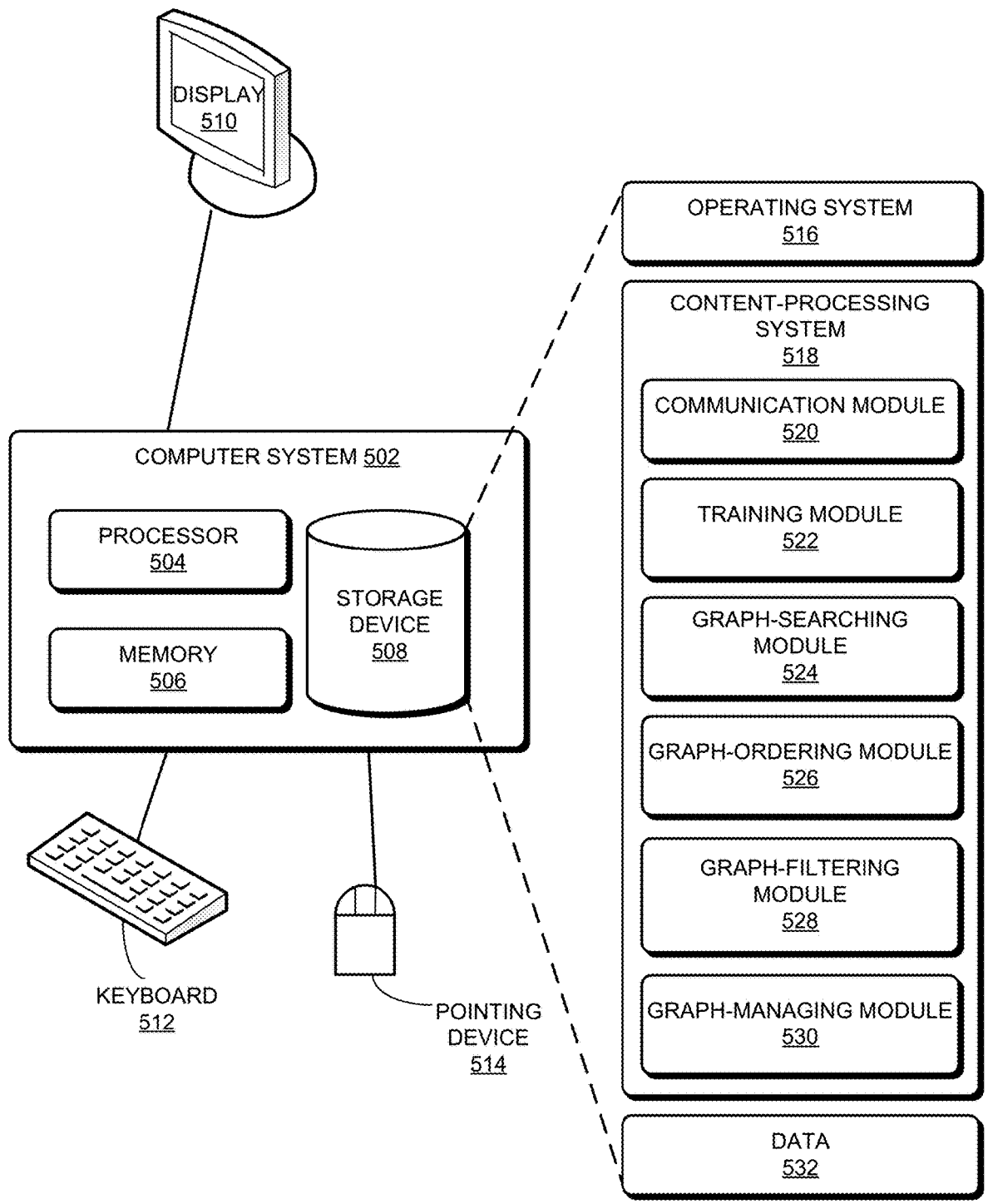
FIG. 5 illustrates an exemplary distributed computer and communication system that facilitates a graph search engine, in accordance with an embodiment of the present invention.

FIG. 5 illustrates an exemplary distributed computer and communication system 502 that facilitates a graph search engine, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network (communication module 520). A data packet can include data, a search request, a graph, and an ordered plurality of graphs.

Content-processing system 518 can further include instructions for receiving, by a server from a client computing device, a search request which includes a user-inputted graph (communication module 520). Content-processing system 518 can include instructions for performing a search based on a structure of the user-inputted graph for a plurality of relevant graphs (graph-searching module 524). Content-processing system 518 can include instructions for ordering the plurality of relevant graphs from a most relevant ranking to a least relevant ranking (graph-ordering module 526). Content-processing system 518 can include instructions for returning, to the client computing device, the ordered plurality of relevant graphs for display on a user interface of the client computing device (communication module 520), thereby enhancing the search for relevant graphs by allowing the graph search engine to take as an input the user-inputted graph and return as an output the relevant graphs (graph-searching module 524).

Content-processing system 518 can also include instructions for defining a simple language based on mathematical notations and symbols for properties and values of a graph, wherein the search request indicates specific filters using the simple language (graph-filtering module 526). Content-processing system 518 can include instructions for, prior to ordering the plurality of relevant graphs, filtering the plurality of relevant graphs based on the specific filters indicated in the search request (graph-filtering module 526). Content-processing system 518 can additionally include instructions for enhancing the performing of the search or the ordering of the plurality of relevant graphs (graph-managing module 530 and training module 522).

Data 532 can include any data that is required as input or that is generated as output by the methods and/or processes described in this disclosure. Specifically, data 532 can store at least: a search request; a graph; a user-inputted graph; a property or a feature; a structure or structural properties or features of a graph; metadata (unstructured and semi-structured); a constraint; a user-defined constraint; a filter; a macro or global property of a graph; a micro or local property of a graph; a ranking function; a list of graphs; an ordered or ranked list of graphs; an ordered or ranked plurality of graphs; a simple language; a mathematical notation or symbol; a property, a feature, or a value for a graph; a representation learning technique; a normalization technique; a non-linear scaling technique; a weighting scheme; a low-rank approximation technique; an online learning technique; a model associated with a graph; relevancy feedback; a predetermined number; a min-max heap; and a weight associated with a feature or a result.

Figure 6:
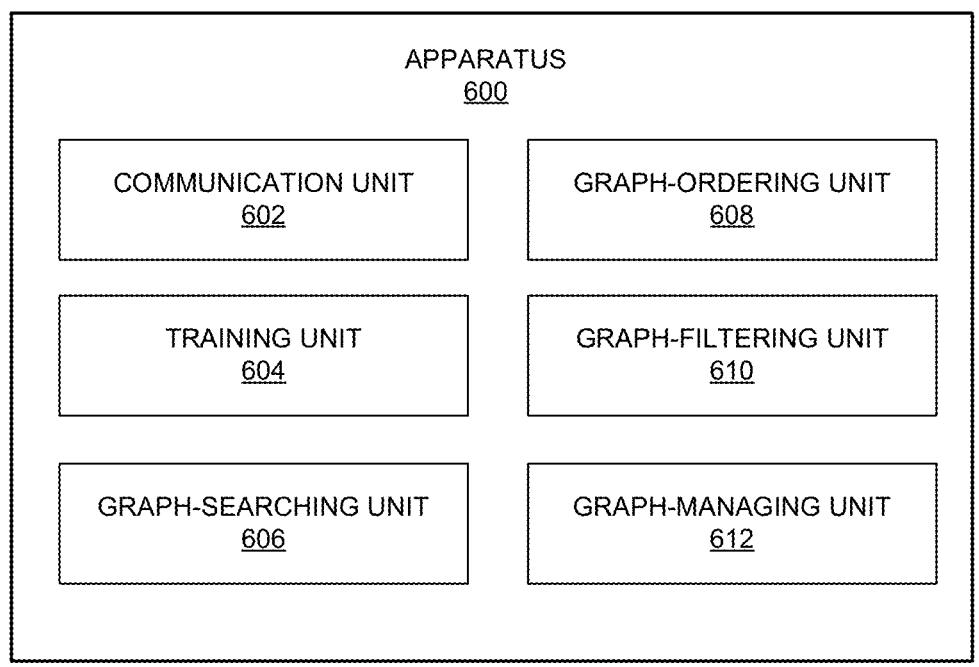
FIG. 6 illustrates an exemplary apparatus that facilitates a graph search engine, in accordance with an embodiment of the present application.

FIG. 6 illustrates an exemplary apparatus 600 that facilitates a graph search engine, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Specifically, apparatus 600 can comprise units 602-612 which perform functions or operations similar to modules 520-530 of computer system 502 of FIG. 5, including: a communication unit 602; a training unit 604; a graph-searching unit 606; a graph-ordering unit 608; a graph-filtering unit 610; and a graph-managing unit 612.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating a graph search engine, the method comprising:
   receiving, by a server from a client computing device, a search request which includes a user-inputted graph;
   performing, based on a structure, a type, a size, and a number of nodes of the user-inputted graph, a search for a plurality of relevant graphs;
   ordering the plurality of relevant graphs from a most relevant ranking to a least relevant ranking;
   returning, to the client computing device, the ordered plurality of relevant graphs; and
   displaying, on a user interface of the client computing device, the ordered plurality of relevant graphs in a plurality of rows,
   wherein each relevant graph is indicated, based on a sequentially ordered rank number, in a respective row which includes at least: a rank number for a respective relevant graph; a name of the respective relevant graph; a type of the respective relevant graph; a number of nodes in the respective relevant graph; and a plurality of additional features and/or properties of the respective relevant graph,
   thereby enhancing the search for relevant graphs by allowing the graph search engine to take as an input the user-inputted graph and return as an output the relevant graphs.

2. The method of claim 1, wherein performing the search is further based on one or more of:
   structural properties of the user-inputted graph;
   metadata associated with the user-inputted graph, wherein the metadata includes one or more of:
      unstructured metadata, which includes one or more of a description of data associated with the user-inputted graph, a type of the user-inputted graph, a type of a node or an edge in the user-inputted graph, and any text-based metadata; and
      semi-structured metadata; and
   user-defined constraints.

3. The method of claim 1, wherein performing the search is further based on one or more of:
   multiple levels of granularity, including one or more of:
      a macro or a global property of the user-inputted graph; and
      a micro or a local property of the user-inputted graph; and
   previously cached graphs which are obtained based on pre-computed properties.

4. The method of claim 1, wherein ordering the plurality of relevant graphs is based on a ranking function.

5. The method of claim 1, further comprising:
   defining a simple language based on mathematical notations and symbols for properties and values of a graph, wherein the search request indicates specific filters using the simple language; and
   prior to ordering the plurality of relevant graphs, filtering the plurality of relevant graphs based on the specific filters indicated in the search request.

6. The method of claim 1, further comprising:
   enhancing the performing of the search or the ordering of the plurality of relevant graphs based on one or more of:
      a representation learning technique;
      a normalization technique;
      a non-linear scaling technique;
      a weighting scheme; and
      a low-rank approximation technique.

7. The method of claim 1, further comprising:
   applying an online learning technique by including implicit or explicit relevancy feedback for the user-inputted graph as training examples; and
   updating a model associated with the user-inputted graph based on the relevancy feedback to improve the ordering of the plurality of relevant graphs over time.

8. The method of claim 1, further comprising:
   storing a predetermined number of the ordered plurality of relevant graphs based on a min-max heap;
   determining whether a specific graph is in the stored predetermined number of the ordered plurality of relevant graphs in an O(1) or a constant time; and
   inserting or deleting a graph from the stored predetermined number of the ordered plurality of relevant graphs in a time which is based on a logarithm of the predetermined number.

9. The method of claim 1, further comprising:
in response to accessing, in an in-memory cache, a feature of a relevant graph or a result which includes an ordered plurality of relevant graphs:
updating a weight associated with the feature or result to prevent the feature or result from being deleted from the in-memory cache.

10. The method of claim 1, wherein performing the search is further based on properties associated with the user-inputted graph, including one or more of: a type or a size of the user-inputted graph; a number of nodes; a number of edges; a density; a degree or a number of incident edges; an assortativity; a number of triangles; an average or a maximum clique; an average or a global clustering coefficient; a clique number; a maximum k-core; a temporal property; a spatial property; an attributed property; a labeled property; multiple types of properties; a heterogeneous property; and any property associated with a graph.

11. A computer system for facilitating a graph search engine, the computer system comprising:
a processor; and
a storage device storing instructions that when executed by the processor cause the processor to perform a method, the method comprising:
receiving, by a server from a client computing device, a search request which includes a user-inputted graph;
performing, based on a structure, a type, a size, and a number of nodes of the user-inputted graph, a search for a plurality of relevant graphs;
ordering the plurality of relevant graphs from a most relevant ranking to a least relevant ranking;
returning, to the client computing device, the ordered plurality of relevant graphs; and
displaying, on a user interface of the client computing device, the ordered plurality of relevant graphs in a plurality of rows,
wherein each respective graph is indicated, based on a sequentially ordered rank number, in a respective row which includes at least: a rank number for a respective relevant graph; a name of the respective relevant graph; a type of the respective relevant graph; a number of nodes in the respective relevant graph; and a plurality of additional features and/or properties of the respective relevant graph,
thereby enhancing the search for relevant graphs by allowing the graph search engine to take as an input the user-inputted graph and return as an output the relevant graphs.

12. The computer system of claim 11, wherein performing the search is further based on one or more of:
structural properties of the user-inputted graph;
metadata associated with the user-inputted graph, wherein the metadata includes one or more of:
unstructured metadata, which includes one or more of a description of data associated with the user-inputted graph, a type of the user-inputted graph, a type of a node or an edge in the user-inputted graph, and any text-based metadata; and
semi-structured metadata; and
user-defined constraints.

13. The computer system of claim 11, wherein performing the search is further based on one or more of:
multiple levels of granularity, including one or more of:
a macro or a global property of the user-inputted graph; and
a micro or a local property of the user-inputted graph; and
previously cached graphs which are obtained based on pre-computed properties.

14. The computer system of claim 11, wherein ordering the plurality of relevant graphs is based on a ranking function.

15. The computer system of claim 11, wherein the method further comprises:
defining a simple language based on mathematical notations and symbols for properties and values of a graph, wherein the search request indicates specific filters using the simple language; and
prior to ordering the plurality of relevant graphs, filtering the plurality of relevant graphs based on the specific filters indicated in the search request.

16. The computer system of claim 11, wherein the method further comprises:
enhancing the performing of the search or the ordering of the plurality of relevant graphs based on one or more of:
a representation learning technique;
a normalization technique;
a non-linear scaling technique;
a weighting scheme; and
a low-rank approximation technique.

17. The computer system of claim 11, wherein the method further comprises:
applying an online learning technique by including implicit or explicit relevancy feedback for the user-inputted graph as training examples; and
updating a model associated with the user-inputted graph based on the relevancy feedback to improve the ordering of the plurality of relevant graphs over time.

18. The computer system of claim 11, wherein the method further comprises:
storing a predetermined number of the ordered plurality of relevant graphs based on a min-max heap;
determining whether a specific graph is in the stored predetermined number of the ordered plurality of relevant graphs in an O(1) or a constant time; and
inserting or deleting a graph from the stored predetermined number of the ordered plurality of relevant graphs in a time which is based on a logarithm of the predetermined number.

19. The computer system of claim 11, wherein the method further comprises:
in response to accessing, in an in-memory cache, a feature of a relevant graph or a result which includes an ordered plurality of relevant graphs:
updating a weight associated with the feature or result to prevent the feature or result from being deleted from the in-memory cache.

20. The computer system of claim 11, wherein performing the search is further based on properties associated with the user-inputted graph, including one or more of: a type or a size of the user-inputted graph; a number of nodes; a number of edges; a density; a degree or a number of incident edges; an assortativity; a number of triangles; an average or a maximum clique; an average or a global clustering coefficient; a clique number; a maximum k-core; a temporal property; a spatial property; an attributed property; a labeled property; multiple types of properties; a heterogeneous property; and any property associated with a graph.

* * * * *